United States Patent
Charles, Jr. et al.

(10) Patent No.: US 7,298,956 B2
(45) Date of Patent: Nov. 20, 2007

(54) TRANSITIONS IN REFRACTIVE INDEX USING ELECTRO-OPTIC POLYMERS

(75) Inventors: Harry K. Charles, Jr., Laaurel, MD (US); Deborah M. Mechtel, Columbia, MD (US); Arthur S. Francomacaro, Eldersburg, MD (US)

(73) Assignee: The Johns Hopkins University, Baltimore, MD (US)

( * ) Notice: Subject to any disclaimer, the term of this patent is extended or adjusted under 35 U.S.C. 154(b) by 7 days.

(21) Appl. No.: 10/526,652

(22) PCT Filed: Sep. 8, 2003

(86) PCT No.: PCT/US03/28020

§ 371 (c)(1),
(2), (4) Date: Nov. 16, 2005

(87) PCT Pub. No.: WO2004/023178

PCT Pub. Date: Mar. 18, 2004

(65) Prior Publication Data

US 2006/0127031 A1 Jun. 15, 2006

Related U.S. Application Data

(60) Provisional application No. 60/408,763, filed on Sep. 6, 2002.

(51) Int. Cl.
*G02B 6/00* (2006.01)
(52) U.S. Cl. ............... 385/147; 385/129; 385/50
(58) Field of Classification Search ............ 385/14, 385/39, 40, 50, 129–132, 147
See application file for complete search history.

(56) References Cited

U.S. PATENT DOCUMENTS

| | | | |
|---|---|---|---|
| 3,809,732 A | 12/1972 | Chandross | |
| 3,953,620 A | 4/1976 | Chandross | |
| 4,856,859 A | 8/1989 | Imoto | |
| 4,886,538 A | 12/1989 | Mahapatra | |
| 5,009,483 A | 4/1991 | Rockwell | |
| 5,100,589 A | 3/1992 | Ticknor | |
| 5,106,181 A | 4/1992 | Rockwell | |
| 5,596,671 A | 1/1997 | Rockwell | |
| 5,837,169 A | 11/1998 | Rourke | |
| 6,081,632 A | 6/2000 | Yoshimura | |
| 6,393,172 B1 | 5/2002 | Brinkman | |
| 6,393,186 B1 | 5/2002 | Deacon | |
| 2003/0108273 A1* | 6/2003 | Kowalczyk et al. | .......... 385/16 |

OTHER PUBLICATIONS

"Two-Dimensional Mode Size Transformation by n-Controlled Polymer Waveguides," by Ryuoji Inaba et al., Apr. 1988.
"Guest-Host Fluorinated Polyimides for Electro-Optic Applications," by T.C. Kowalczyk et al., Nov. 1994.

* cited by examiner

*Primary Examiner*—Kevin S. Wood
(74) *Attorney, Agent, or Firm*—Francis A. Cooch; Benjamin Y. Roca

(57) ABSTRACT

The index of refraction in a length of doped and/or "doped-and-poled" electro-optic polymers is controlled so that a gradual transition from a low Δn to a high Δn, or vice versa, is achieved for use in, for example, a lightguide-to-fiber transition. Multiple methods for creating this gradual transition are disclosed.

16 Claims, 5 Drawing Sheets

Position along lightguide

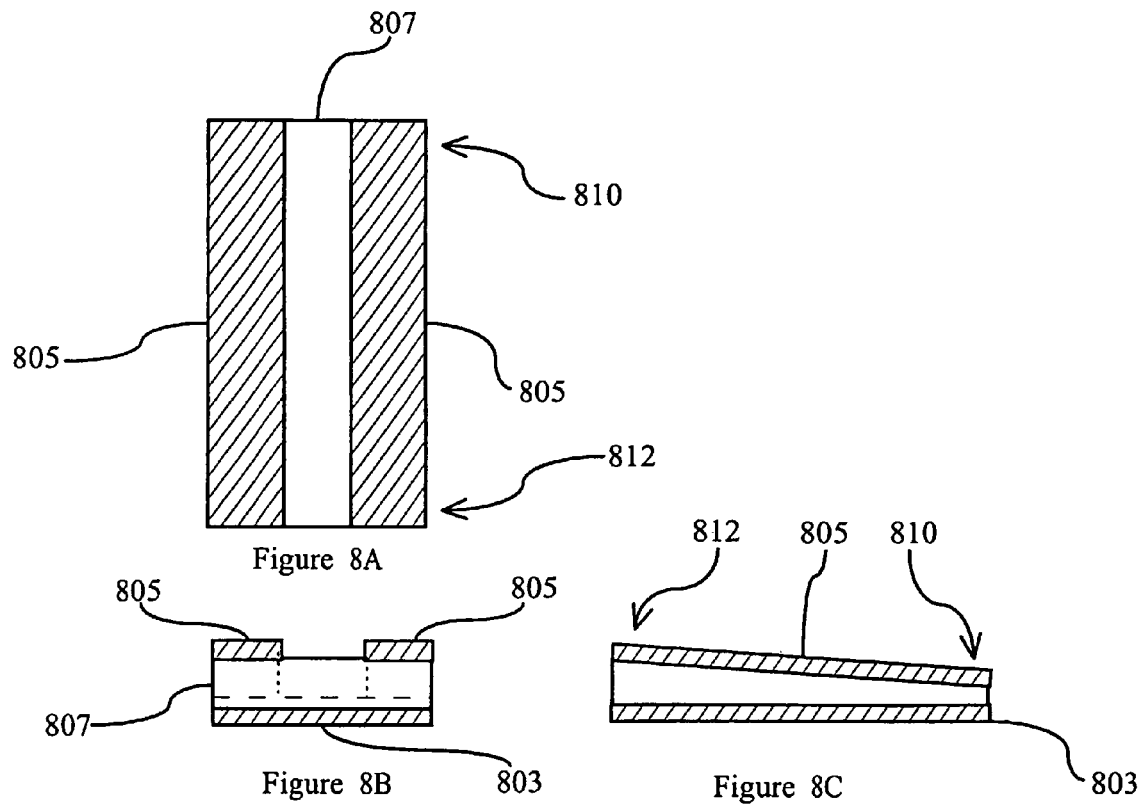
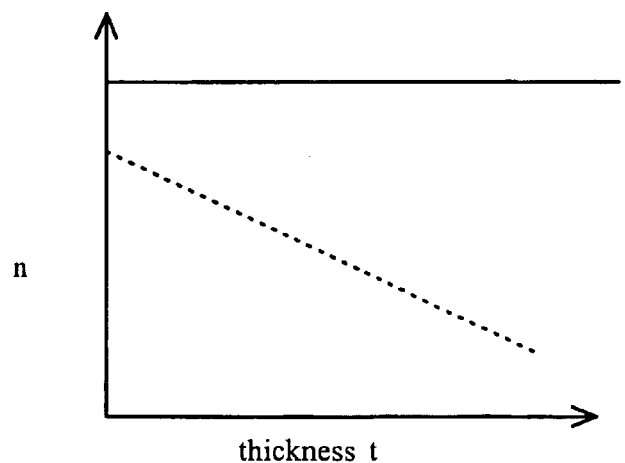
Figure 9

TRANSITIONS IN REFRACTIVE INDEX USING ELECTRO-OPTIC POLYMERS

CROSS-REFERENCE TO RELATED APPLICATIONS

This application claims the benefit of prior filed U.S. provisional Application No. 60/408,763, filed on Sep. 6, 2002, incorporated fully herein by reference.

BACKGROUND OF THE INVENTION

1. Field of the Invention

This invention relates to a method for coupling lightguides to fiber optic transmission lines.

2. Description of the Related Art

In the electro-optic or photonics industry, it is frequently necessary to couple lightguides with fiber optic transmission lines, e.g., when coupling an optical component on a circuit board to a light pipe. A major problem when coupling lightguides to fiber optic transmission lines is that typically lightguides have a high "refractive index difference" ($\Delta n$) percentage between the core and the cladding as compared to the $\Delta n$ of fiber optic transmission lines. A typical on-chip or on-circuit board planar lightguide has a $\Delta n$ of 4-5%, while a typical fiber optic transmission line has a $\Delta n$ of approximately 0.5-2%. This significant drop of $\Delta n$ between the lightguide and the transmission line causes problem, e.g., reflection resulting in a reduction in the amount of light that can be transmitted. To solve this problem, optical coupling techniques have been used to ease the transition from this low-to-high or high-to-low $\Delta n$'s, for example, lenses are used to focus (or spread) the light, making the transition more gradual. While functioning adequately, prior art techniques are custom solutions that are costly and that take up significant space on a circuit board or other location where space is at a premium.

SUMMARY OF THE INVENTION

In accordance with the present invention, the index of refraction in doped and/or "doped-and-poled" electro-optic polymers is controlled so that a gradual transition from a low $\Delta n$ to a high $\Delta n$, or vice versa, is achieved for use in, for example, a lightguide-to-fiber transition. Multiple methods for creating this gradual transition are disclosed.

BRIEF DESCRIPTION OF THE DRAWINGS

FIGS. 8a-8c illustrate a common reference electrode and common poling electrode used to sandwich a tapered doped material according to another embodiment of the present invention; and FIG. 9 illustrates the decreasing $\Delta n$ that results from applying a constant poling voltage to a doping material of increasing smaller thickness.

DESCRIPTION OF THE PREFERRED EMBODIMENT(S)

The overall concept of the present invention is the controlled changing of the index of refraction of doped and/or doped-and-poled electro-optic polymers from one region of the polymer to the next. This control can be performed by controlling the optical chromophore doping (percentage of chromophore by weight) of the polymer and the temperature of the polymer cure. In a doped-and-poled polymer, the strength of the poling field is also a major variable, coupled with the doping percentage and, to some degree, the temperature at which the poling process takes place. Both the doping and the amount of poling can be selectively accomplished by masking and the strategic placement of poling electrodes using known techniques.

By changing gradually the index of refraction along a connection between a lightguide and a fiber optic transmission line, the sudden change in the index of refraction between the lightguide and the fiber optic transmission line is alleviated, thereby alleviating the problems associated therewith. Several embodiments are described below for performing this gradual transition.

Figure 1A:
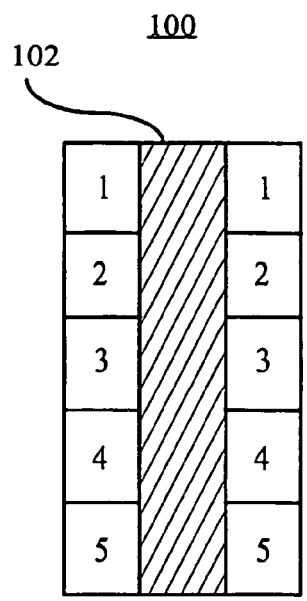
FIGS. 1a-1c illustrate top, end, and side views, respectively, of a lightguide-to-optical-transmission-line coupler in accordance with the present invention.
Figure 1B:
Figure 1C:
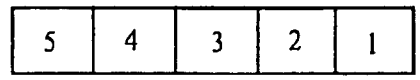

FIGS. 1a-1c and 2 illustrate a first embodiment of the present invention. FIGS. 1a-1c illustrate top, end, and side views, respectively, of a lightguide-to-optical-transmission-line coupler in accordance with the present invention. Referring to FIG. 1, a coupler 100 is shown having a core 102 and doping regions 1-5 on either side thereof. The high index core comprises an undoped polymer and the doping regions 1-5 are regions of increasingly heavier doping deposited sequentially along the length (on both sides) of the high index core 102 as shown. The lowest doped region is region 1 and the highest doped region is doping region 5 with varying levels of increasing doping occurring in doping regions 2, 3, and 4, respectively. The regions of increased doping can be formed by, for example, selective deposition through a protective masking layer that is patterned photolithographically. The actual number of depositions (or regions) is not limited to five and varies depending upon the required $\Delta n$ shift; thus, there may be greater or fewer doping regions, depending upon need. If the doping regions are large, shadow masking may be used. Polymer deposition can be accomplished by spraying, dipping, vacuum pyrolysis, or any other known deposition means which will produce the gradually increasing doped regions.

Figure 2:
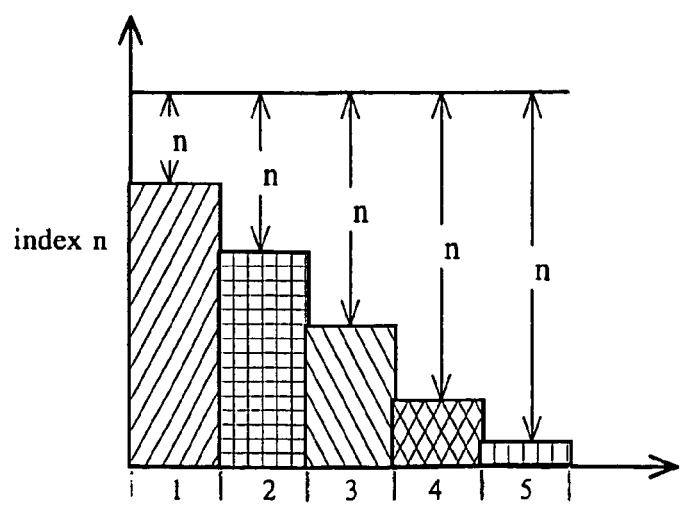
FIG. 2 is an index profile showing the change in the $\Delta n$ values of regions 1-5 of FIGS. 1a-1c.

FIG. 2 is an index profile showing the change in the $\Delta n$ values of regions 1-5 of FIGS. 1a-1c. As can be seen, with each doping region, beginning with doping region 1, the $\Delta n$ value increases incrementally from a low $\Delta n$ at doping region 1 to the highest $\Delta n$ at doping region 5.

By providing a coupler 100 with these characteristics, a fiber optic transmission line can be coupled at the end closest to region 1 (so that the low $\Delta n$ percentage of the fiber optic transmission line will be close in value to that of region 1 of the coupler 100), and the lightguide can be coupled to region 5 of coupler 100 (so that the higher $\Delta n$ value of the lightguide is more closely matched to region 5 of coupler 100) thereby resulting in a gradual transition from lightguide to transmission line.

Figure 3A:
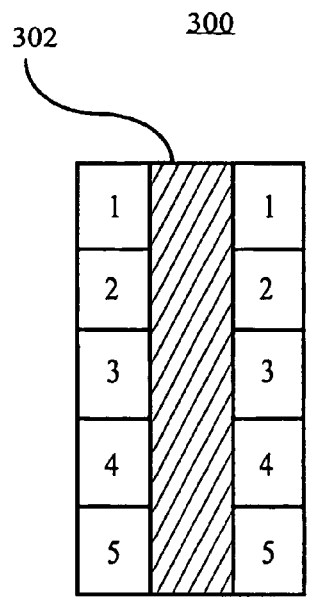
FIGS. 3a-3c illustrate top, end, and side views, respectively, of a lightguide-to-optical-transmission-line coupler in accordance with an alternative embodiment of the present invention.
Figure 3B:
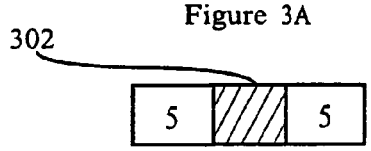
Figure 3C:
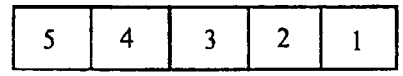
Figure 4:
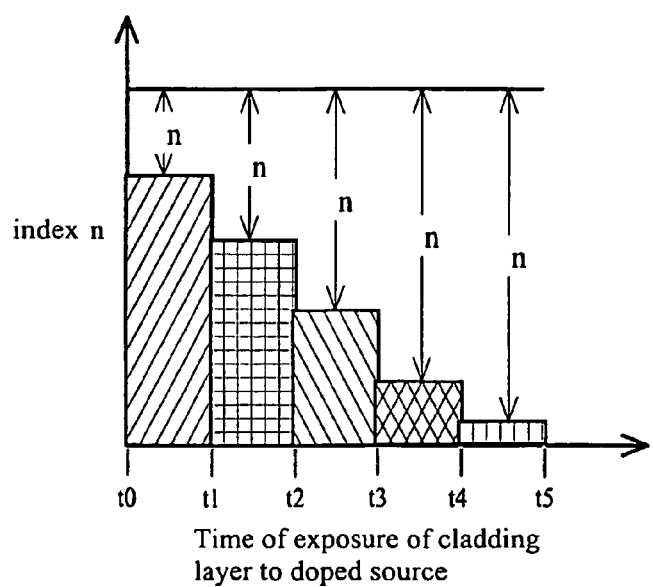
FIG. 4 illustrates the relationship of the time of the exposure of a cladding layer to doped source, to the $\Delta n$ values with respect to the embodiment of FIGS. 3a-3c.
Figure 5A:
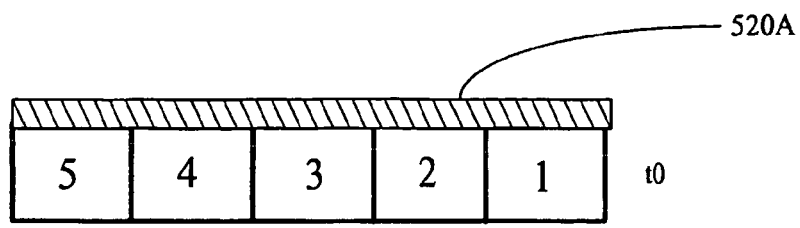
FIGS. 5a-5f illustrates the selective removal process of the embodiment of FIGS. 3a-3c.
Figure 5B:
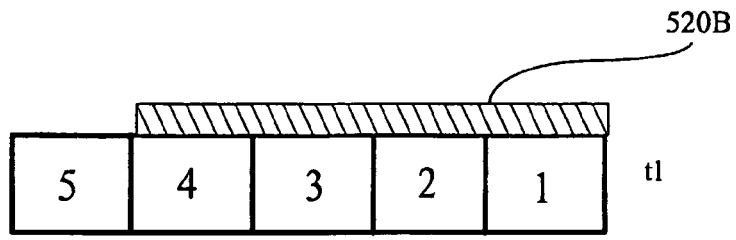
Figure 5C:
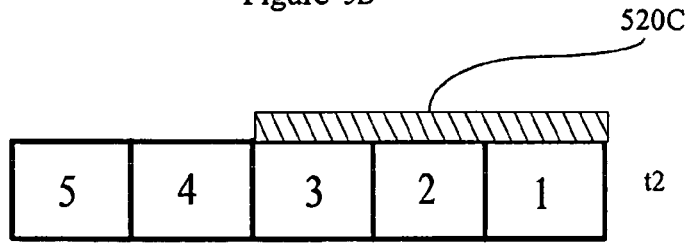
Figure 5D:
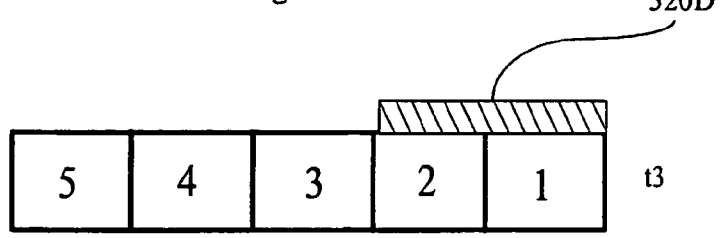
Figure 5E:
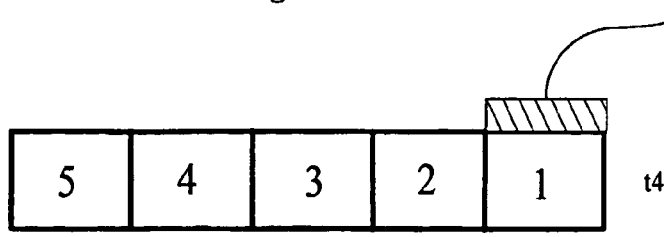
Figure 5F:
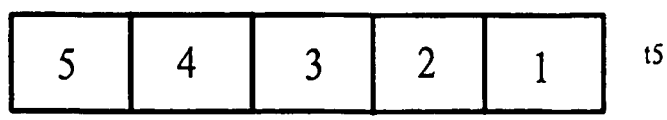

FIGS. 3-5 illustrate an alternative embodiment of the present invention, in which doping regions 1-5 of increasing heavier doping are formed by diffusion doping of an undoped polymer (core 302 in FIG. 3a) for varying periods of time. Using this method, an impurity source 520 (FIGS. 5a-5f), such as a very heavily doped polymer film, is deposited on top of the entire region 1-5 (the region to receive the progressively increasing doping levels). Impurity source 520 is then selectively removed with time to create the increasing doped density, by position along the core, in the cladding layer. The selective removal process is illustrated in FIGS. 5a-5f. Specifically, at time T0, the entire doping region (all regions 1-5) are covered by the impurity source 520. At time T1 (FIG. 5b) the portion of the impurity source 520 covering region 5 has been removed. At time T2 (FIG. 5c), the portion of impurity source 520 covering region 4 has also been removed; at time T3 (FIG. 5d) the portion of impurity source 520 over region 3 has been removed; at time T4 (FIG. 5e) the portion of impurity source 520 over region 2 has been removed; and finally, at time T5 (FIG. 5f) the last remaining portion of impurity source 520 over region 1 has been removed. Thus, the very heavily doped polymer film is kept in place over different regions for differing amounts of time, with longer diffusion times producing heavier doping and, thus, a larger $\Delta n$ value. This diffusion doping can be performed with cladding polymer in the uncured state and is most accurate when the diffusion temperature is controlled to remain constant.

FIG. 4 illustrates the relationship between the time of exposure of the cladding layer to the doped source, and the $\Delta n$ values. As can be seen, the longer the doping time t, the greater the $\Delta n$ value.

Figure 6A:
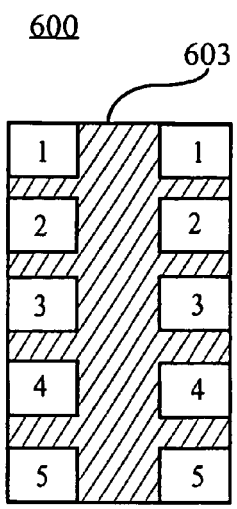
FIGS. 6a-6c illustrate top, end, and side views, respectively, of a coupler which has formed thereon separated poling electrodes according to another embodiment of the present invention.
Figure 6B:
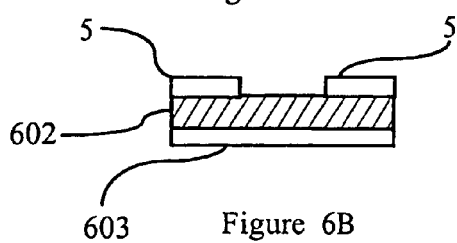
Figure 6C:
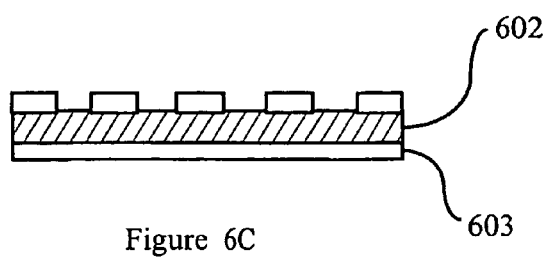
Figure 7:
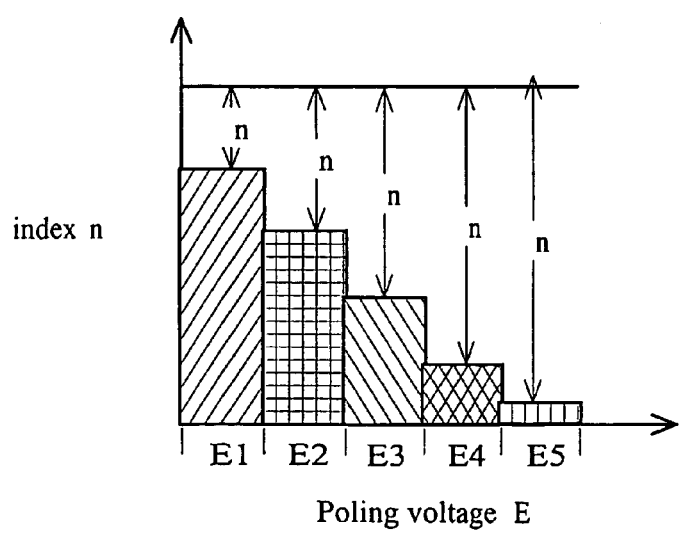
FIG. 7 illustrates the resulting gradually increasing $\Delta n$ value of the embodiment of FIGS. 6a-6c.

A third embodiment is illustrated in FIGS. 6a-6c and FIG. 7. Referring to FIGS. 6a-6c, a coupler 600 has formed thereon separated poling electrodes 1-5, one set on the left and one set on the right, as shown in FIG. 6a. These are formed on a doped polymer layer 602 in a well-known manner. A reference electrode layer 603 is formed underneath the doped polymer layer 602 to provide a reference electrode for the individual poling electrodes. The doped polymer layer 602 is selectively poled along its length using larger and larger fields or poling voltages (E1-E5 of FIG. 7). A high poling field voltage applied to an electrode provides greater doping and thus greater $\Delta n$ values than an area energized by a smaller poling voltage. Thus, by energizing electrode 1 with a lower poling voltage E1 and increasing the poling voltage sequentially along electrodes 2-5, a gradually increasing $\Delta n$ value, from electrode 1 to electrode 5, will result, as shown in FIG. 7. This results in a doped core surrounded by doped-and-poled cladding.

A further embodiment is illustrated in FIGS. 8a-8c and FIG. 9. This embodiment takes advantage of the fact that an equal poling voltage applied to doped materials of different thicknesses will result in a higher $\Delta n$ for the narrower doped material and a lower $\Delta n$ for the thicker doped material. Thus, as illustrated in FIGS. 8a-8c, a common reference electrode 803 and common poling electrodes 805 (one on each side, as shown in FIGS. 8a and 8b) are used to sandwich a tapered doped material 807 (e.g., an electro-optic film deposited as a combination core/cladding layer using, for example, spray deposition through a moving shutter, or by continuously changing the extraction range in a dip coating process). Because the doped material 807 is tapered, continuous poling electrodes 805 (one on each side) can be used because the constant applied voltage will produce a continuously changing field gradient (see FIG. 9) due to the changing thickness of the layer of doped material 807. This results in a coupler 800 that has a first end 810 that has a higher $\Delta n$ than the other end 812, with gradually increasing $\Delta n$ values therebetween. This is just another example of an embodiment of the present invention whereby a transition from low-to-high or high-to-low $\Delta n$ values can be achieved to allow a smooth transition from lightguide to transmission line.

By virtue of the present invention, transitions between lightguides and fiber can be manufactured more cheaply and easily, and the resulting transition is smaller and less costly than those of the prior art. While the above-described embodiments describe some fundamental structures and implementation methods, it is understood that other possible combinations are possible and are covered by the pending claims. The key concept is that the index of the electro-optic polymer can be changed by doping, and changed still further by poling the doped region. With such ability to change a given polymer's index, there is no need to form complex transition structures by depositing ordinary materials of different dielectric constant and thickness. Other transitions can be made, such as vertical step-up and step-down structures, for example. With the proper choice of polymer and embedded chromophore, a reversible molecular polarization (or alignment) can be created, i.e., if the field is removed, the material reverts to its unaligned state. As the applied field increases, the index shifts in proportion to the field until full alignment (maximum $\Delta n$) is reached. Such an electrically controllable index change could be useful in directing incoming light beams to different detectors, thus producing a type of switch. Similarly, controlling index changes coupled with electro-optic interactions could also be useful in the modulation and demodulation of light beams. Many polymers exhibit this behavior when appropriately doped with optical chromophores, including polyimides and acrylics.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

The invention claimed is:

1. A method for producing a transition between a first element having a first refractive index difference. ($\Delta n$) percentage and a second element having a second $\Delta n$ percentage higher than the $\Delta n$ of said first element, comprising the steps of:
   controlling the $\Delta n$ along a length of electro-optic polymer to achieve a gradual transition from a low $\Delta n$ to a high $\Delta n$ along said length; and
   optically coupling said length of electro-optic polymer between said first element and said second element,
   wherein said controlling step comprises at least the step of:
   performing selective deposition on a length of undoped substrate having plural doping regions, using increasing doping levels with each successive doping region.

2. The method of claim 1, wherein said selective deposition step is performed using a polymer dopant.

3. The method of claim 2, wherein said polymer dopant is deposited through photolithographic masking.

4. The method of claim 3, wherein said polymer dopant is deposited by spraying said polymer dopant through said photolithographic masking onto said substrate.

5. The method of claim 3, wherein said polymer dopant is deposited by dipping said photolithographically-masked substrate into said polymer dopant.

6. The method of claim 3, wherein said polymer dopant is deposited using vacuum pyrolisis.

7. A method for producing a transition between a first element having a first refractive index difference $\Delta n$ percentage and a second element having a second $\Delta n$ percentage higher than the $\Delta n$ of said first element, comprising the steps of:

controlling the $\Delta n$ along a length of electro-optic polymer to achieve a gradual transition from a low $\Delta n$ to a high $\Delta n$ along said length; and optically coupling said length of electro-optic polymer between said first element and said second element, wherein said controlling step comprises at least the step of:

performing diffusion doping on a length of undoped substrate having plural doping regions, increasing the diffusion time with each successive doping region.

8. The method of claim 7, wherein said step of performing diffusion doping comprises the steps of:

depositing a layer of an impurity source on said entire length of said substrate and leaving said layer on said substrate for a predetermined time period;

removing a portion of said layer covering a first of said plural doping regions and leaving the remainder of said layer on said substrate for a second predetermined time period;

repeating said removing step for each of said plural doping regions until all of said layer has been removed.

9. A transition structure situatable between a first element having a first refractive index difference ($\Delta n$) percentage and a second element having a second $\Delta n$ percentage higher than the $\Delta n$ of said first element, said transition structure obtainable by the process steps of:

controlling the $\Delta n$ along a length of electro-optic polymer to achieve a gradual transition from a low $\Delta n$ to a high $\Delta n$ along said length; and optically coupling said length of electro-optic polymer between said first element and said second element, wherein said controlling step comprises at least the step of:

performing selective deposition on a length of undoped substrate having plural doping regions, using increasing doping levels with each successive doping region.

10. The transition structure of claim 9, wherein said selective deposition step is performed using a polymer dopant.

11. The transition structure of claim 10, wherein said polymer dopant is deposited through photolithographic masking.

12. The transition structure of claim 11, wherein said polymer dopant is deposited by spraying said polymer dopant through said photolithographic masking onto said substrate.

13. The transition structure of claim 11, wherein said polymer dopant is deposited by dipping said photolithographically-masked substrate into said polymer dopant.

14. The transition structure of claim 11, wherein said polymer dopant is deposited using vacuum pyrolisis.

15. A transition structure situatable between a first element having a first refractive index difference ($\Delta n$) percentage and a second element having a second $\Delta n$ percentage higher than the $\Delta n$ of said first element, said transition structure obtainable by the process steps of:

controlling the $\Delta n$ along a length of electro-optic polymer to achieve a gradual transition from a low $\Delta n$ to a high $\Delta n$ along said length; and optically coupling said length of electro-optic polymer between said first element and said second element, wherein said controlling step comprises at least the step of:

performing diffusion doping on a length of undoped substrate having plural doping regions, increasing the diffusion time with each successive doping region.

16. The transition structure of claim 15, wherein said step of performing diffusion doping comprises the steps of:

depositing a layer of an impurity source on said entire length of said substrate and leaving said layer on said substrate for a predetermined time period;

removing a portion of said layer covering a first of said plural doping regions and leaving the remainder of said layer on said substrate for a second predetermined time period;

repeating said removing step for each of said plural doping regions until all of said layer has been removed.

* * * * *